Dec. 16, 1930. P. F. HELLERMANN 1,785,628
GRIP FOR ELECTRIC CABLES
Filed May 25, 1928

Inventor:
P. F. Hellermann,
By Langner, Parry, Card & Langner
Attys.

Patented Dec. 16, 1930

1,785,628

UNITED STATES PATENT OFFICE

PAUL FRIEDRICH HELLERMANN, OF HAMBURG, GERMANY

GRIP FOR ELECTRIC CABLES

Application filed May 25, 1928, Serial No. 280,621, and in Germany May 31, 1927.

This invention relates to a grip for electric cables contrived to relieve the wires of mechanical strains when it is attempted, as is usually done, to sever the plug and socket or whatever other form of connection is used, by pulling on the cable.

It is well known that in the use of electric appliances such for instance, as electric toasters, pressing irons, etc., the connections at the appliance become too hot to sever by hand when one wishes to disconnect the apparatus. Furthermore, electrical appliances of the kind specified are frequently connected by means of a plug to a socket in one of the lighting fixtures which is inconvenient to reach at the time when it may be desired to discontinue the use of the appliance. In all such cases it is the common practice to catch hold of the electric cord or cable at any convenient point and by this means to pull the connection apart either between the cable and appliance or between the cable and appliance outlet, as the case may be. This is admittedly a destructive practice since the degree of tension necessary to sever the connection is such as tends to pull the free ends of the wires away from the screws or other connecting means by which they are electrically connected in the connector itself. Eventually, this abuse of the cable breaks the ends of the wires within the connector and short-circuiting results.

The present invention contemplates the provision of a member, which is tied to the insulation of the cable, and in turn, retained within the connector, so that the pull upon the cable is resisted by the insulation of the cable itself where it is wrapped around or tied to this member, entirely relieving the ends of the wires of the cable which are electrically connected to parts within the connector, from any pulling strain whatsoever.

A cable grip according to the invention comprises a collar to be slipped over the end of the cable and having projections remote from the cable end, behind which projections are looped parts of the cable which have been turned back to hold the collar.

Figure 1:
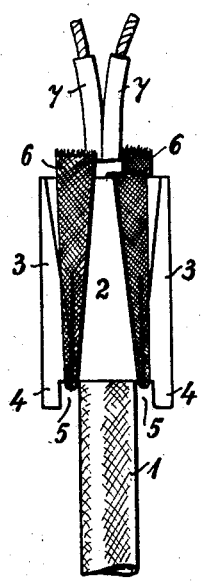
Figure 5:
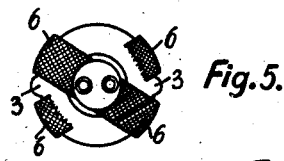
Figure 6:
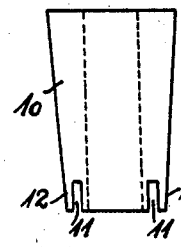

The invention is illustrated in the accompanying drawing in which Figs. 1-4 show a collar of substantially conical form sleeving the electric cable;

Fig. 5 is an elevation at right angles to Fig. 1; Figs. 6-10 illustrate modified constructions of the collar.

In the construction shown in Figs. 1 to 4 on the cable 1 is fitted loosely or held by its own tension a collar 2 having a substantially conical external surface. This collar 2 is provided on its external periphery with ribs 3 (two such ribs being shown), which are prolonged at the end opposite the terminal ends of the conductors, forming projections 4. These projections 4 afford depressions or recesses 5 to give a hold to parts of the cable which have been turned back on the collar 2, whereby the collar is secured.

In the construction shown in Fig. 1 two ribbons 6 worked into the insulating covering of the cable or fringed from such covering are turned back on the collar 2. The two ribbons 6 may be knotted to one another or to the cable at the end face of the collar presenting the projections 4. Preferably, as will be understood from Fig. 1, these ribbons may be again turned towards the opposite end of the collar and knotted together at their ends or knotted to the cable. If desired the end portions of the ribbons may be wound about the rubber-insulated wires 7 of the cable, and may be fixed by adhesive, so that these wires are additionally insulated.

Figure 3:
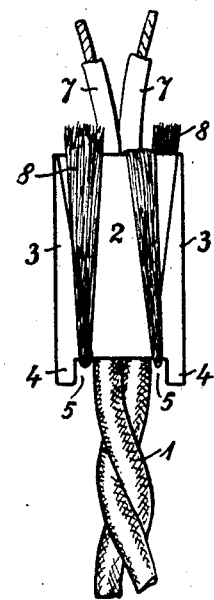

The form shown in Fig. 3 differs from that shown in Fig. 1 in respect that, instead of ribbons 6, there are used bunches of threads of the insulating covering fabric, fringed out of the fabric, being fixed as described with reference to Fig. 1.

Instead of the ribbons 6 or the fringed covering 8 there may be used other parts of the cable material, such as cordlike parts of the covering, filling material or the like.

Figure 2:
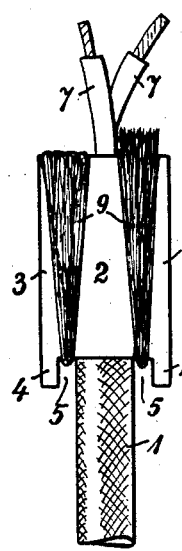
Figure 4:
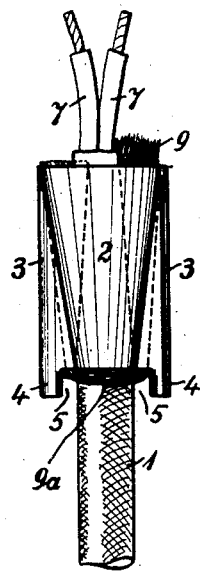

In the form shown in Figs. 2 and 4 there is used only a single plait 9 of the cable material; this plait is first turned back at one side of the collar 2, then led around the cable at 9ª, and to the other side of the collar and then led to the opposite end of the collar.

The collar shown in Figs. 1 to 5 departs from circular form in cross section, so that, when the section of the perforation in the connection piece also deviates from circular form, that is to say, conforms more or less with the sectional form of the collar 2, the collar and thus also the cable are ensured against rotation.

Figure 7:
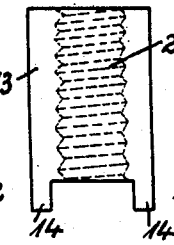
Figures 8, 9:
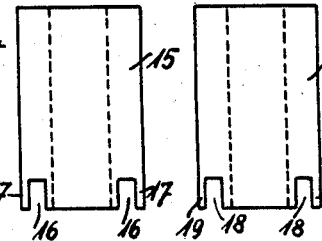
Figure 10:
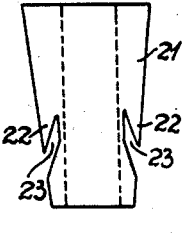

The projections or recesses which give a hold to the cable parts when turned back may be formed in several ways, as will be seen from consideration of Figs. 6 to 10, it being understood that the collars may be of circular or non-circular form in cross section. In the construction shown in Fig. 6 the cone 10 is provided with a cylindrical perforation and one end face is formed with notches 11 affording projections 12. In the construction shown in Fig. 7 the collar 13 is cylindrical and one end face is provided with projections or studs 14. The collar 15 shown in Fig. 8 is provided with notches 16 similar to those shown in Fig. 6, forming projections or lugs 17. The collar 20 shown in Fig. 9 is similar to that shown in Fig. 8, but is of rectangular cross section. Fig. 10 finally illustrates a collar formed as a truncated cone 21, in which the lugs 22 are formed by notching at 23. All these collars may be used as described with reference to Figs. 1 to 4.

It may be of advantage to form the central opening or perforation of the collar with a female-screw-thread as at 24, Fig. 7, particularly if the conductors are provided with metallic sheaths so that the collar can be screwed on.

In all cases it is of advantage to ensure a snug fitting of the collar and its socket or connecting piece. If the collar is conical, the connecting piece need not but may have a surface, that contacts with the end face of the collar remote from the cable end. If the collar is cylindrical or of rectangular cross-section, Figs. 7 to 9, the socket or connecting piece should engage the said end face of the collar and may mate with such end face, that is it may be provided with recesses to be entered by the projections or lugs on the end face of the collar, or it may be provided with projections or lugs which enter recesses or notches on the end face of the collar. In certain circumstances the end face of the socket may be quite smooth particularly if the recesses in the end face of the collar are more or less filled up by the turned-back parts of the cable, as is shown for instance in Fig. 4, or if the ribbons or fringes are knotted together or to the cable itself.

I claim:—

In combination, an insulated multi-wire electrical cable, and a member adapted to be retained by a connector, said member having a bore through which said cable is passed, with the free ends of the wires of said cable extending beyond one end of said member, said cable being formed with strands of its insulation separated therefrom to a point substantially where it enters said member, but still left integral with the insulation of said cable, said member being formed at its ends with shoulders forming abutments about which said strands are wrapped to unite said member and said cable, one end of said member being formed with projecting lugs for holding said strands in place.

In testimony whereof I have signed my name to this specification.

PAUL FRIEDRICH HELLERMANN.